Patented Aug. 3, 1926.

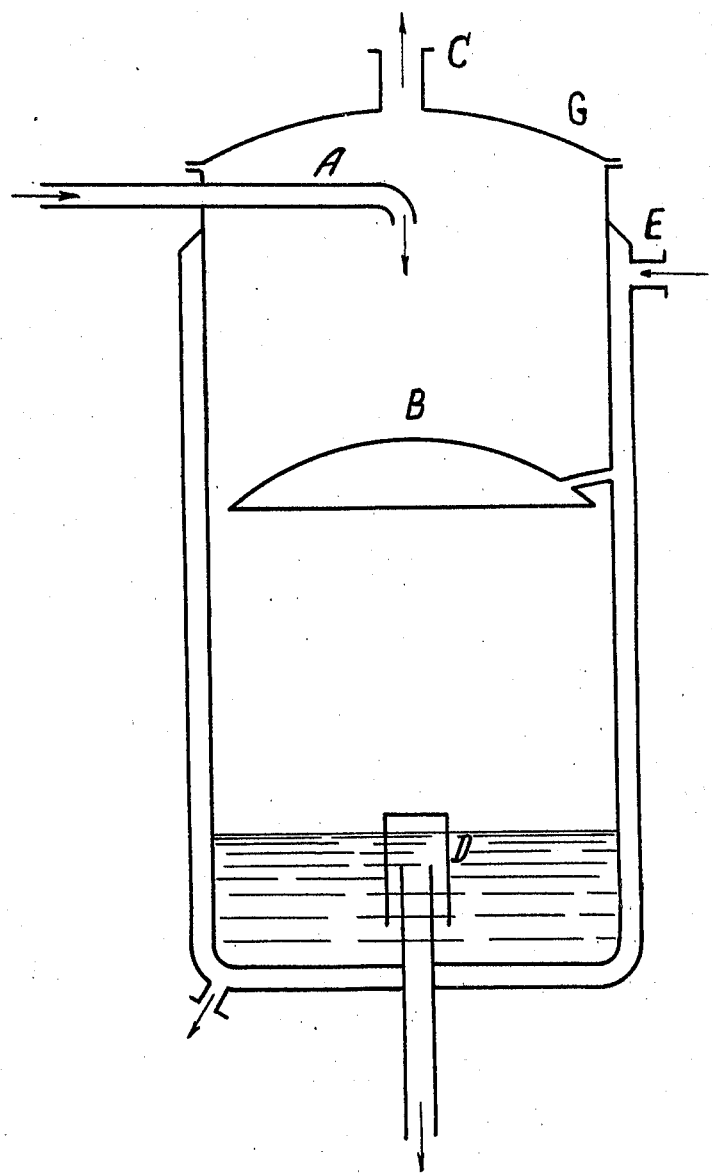

1,594,783

UNITED STATES PATENT OFFICE.

EBERHARD LEGELER, OF PREMNITZ, WESTHAVELLAND, GERMANY.

PROCESS FOR THE CONTINUOUS SEPARATION OF SULPHUR FROM SULPHUR SOLUTIONS.

Application filed December 1, 1925, Serial No. 72,552, and in Germany June 7, 1925.

This invention relates to a process for the continuous separation of sulphur from sulphur solutions.

According to the invention the sulphur solution is placed in a vessel heated on all sides and in this vessel is allowed to drip on to a device heated up to the boiling point of the solvent and at least up to the melting point of the sulphur.

In the accompanying drawing a piece of apparatus suitable for use in carrying out the invention is diagrammatically illustrated in sectional elevation.

The process forming the subject-matter of the invention is based on the fact that when crystallizing sulphur from sulphur solutions more or less considerable quantities of the solvent are enclosed by the crystals. In order to obviate this enclosure of the solvent by the crystals and to enable on the one hand sulphur in a pure form and on the other hand pure solvent to be recovered, the sulphur solution is introduced into a vessel G, which may be for example cylindrical in shape and which is heated on all sides. In this cylindrical vessel at about half its height is located a plate or impact device B which is heated to a temperature somewhat above the boiling point of the solvent and at least above the melting point of the sulphur, the said plate or impact device being in the form of a segment of a sphere, a double-walled sieve or even conical or the like and the molten solution being allowed to drip on to it. Upon dropping on to the plate B the sulphur separates out by evaporation of the solvent and flows in a molten condition over the edges of the plate into the lower part of the vessel G, out of which it can be drawn by inserting a siphon of known form. The sulphur obtained is of remarkable purity. The solvent vapors drawn off may be condensed in a known manner and used again.

One form of the process may be carried out for example in the following manner. The solution of sulphur in the solvent flows at A into a cylindrical vessel G, which is surrounded on all sides and also at the bottom with a heating jacket. Upon dropping on the heating body B the solvent evaporates and the resultant sulphur is melted by the heating body, which is heated for example to 120° C., and flows into the lower part of the vessel. Through the siphon D the sulphur may be discharged either continuously or at definite intervals. Through C the evaporated solvent escapes in a pure form and may be condensed in a cooler.

Having now particularly described and ascertained the nature of my said invention and in what manner the same is to be performed, I declare that what I claim is:—

A process for the continuous separation of sulphur from sulphur solutions, consisting in causing the sulphur solution to drip on to a body enclosed in a vessel heated on all sides, said body being heated up to a temperature at least as high as the boiling point of the solvent and at least as high as the melting point of the sulphur.

In testimony whereof I have signed my name to this specification.

DR. EBERHARD LEGELER.